July 6, 1926.  
O. E. STUTSMAN  
1,591,574  
WELDING AND ASSEMBLING FORM  
Filed Feb. 13, 1923  2 Sheets-Sheet 1
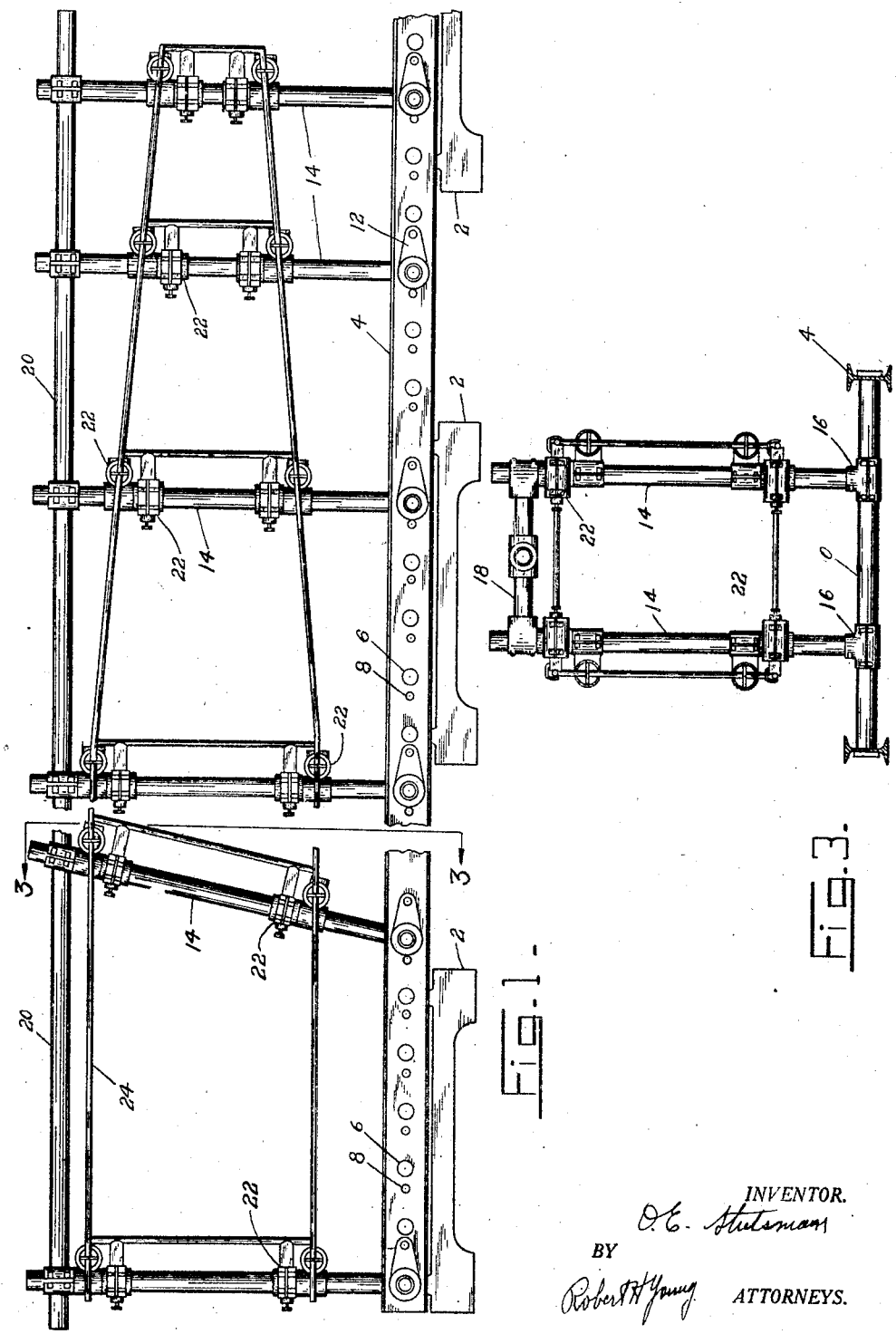
INVENTOR.  
O. E. Stutsman  
BY  
Robert H Young  ATTORNEYS.

July 6, 1926.
O. E. STUTSMAN
1,591,574
WELDING AND ASSEMBLING FORM
Filed Feb. 13, 1923
2 Sheets-Sheet 2
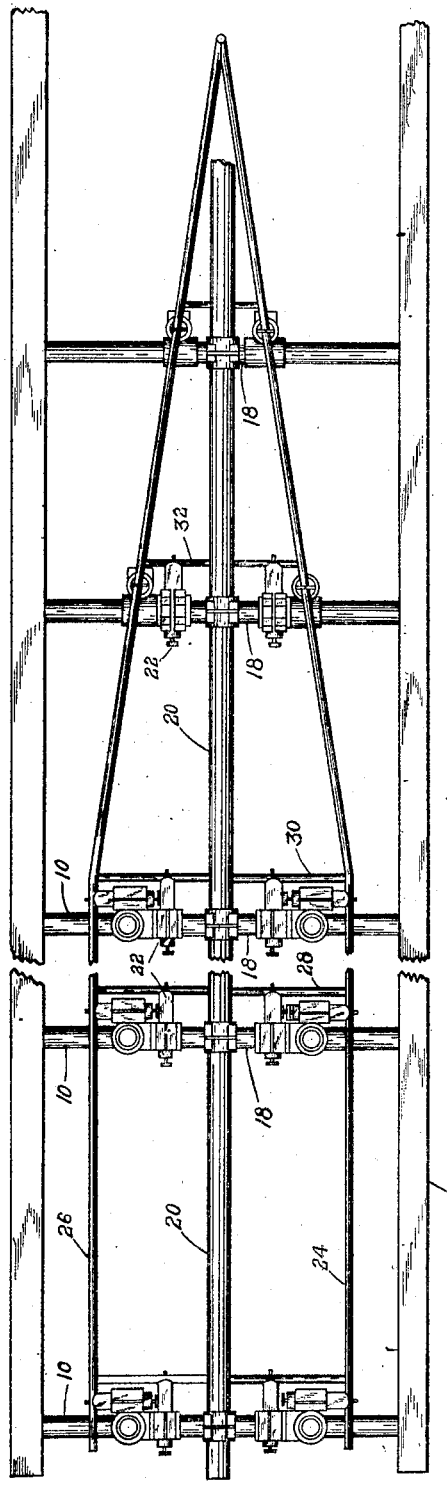
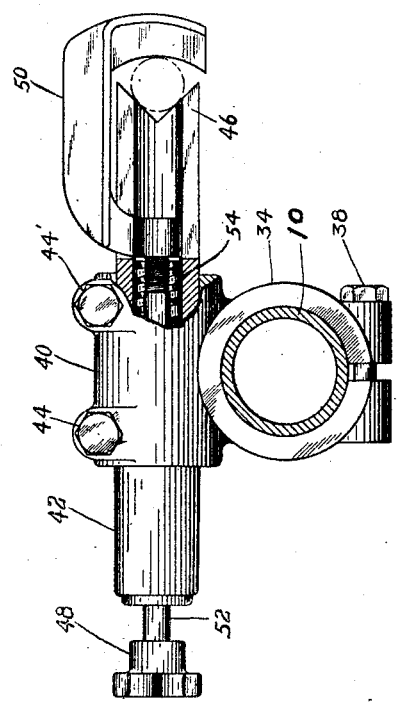
INVENTOR.
O. E. Stutsman
BY
ATTORNEYS.

Patented July 6, 1926.

1,591,574

UNITED STATES PATENT OFFICE.

OHMER E. STUTSMAN, OF DAYTON, OHIO.

WELDING AND ASSEMBLING FORM.

Application filed February 13, 1923. Serial No. 618,807.

This invention is designed to enable structural elements to be readily and accurately assembled and relates more particularly to the assembly of airplane fuselages, automobile bodies and the like.

It is a prime object of my invention to provide means for securing the component elements of a fuselage skeleton in their relative positions, in order to more efficiently and accurately handle and inspect the work.

It is a further object of the invention to make it adaptable for use at any time and to the assembly of any apparatus, such as an airplane fuselage, be it large or small.

Another object is to devise an apparatus of this type which may itself be dismantled and reassembled quickly and to suit varying conditions.

Other objects will become apparent from the description, claims and drawing, in which:

Fig. 1 is a side elevation
Fig. 2 is a top plan view
Fig. 3 is a section looking in the direction of the arrows on the line 3—3 of Fig. 1 and
Fig. 4 is a detail of one of the universal fittings.

The form itself consists of base members comprising standards 2 (Fig. 1) upon which are mounted I-beams or similar units 4 which have a multiplicity of large holes 6 and small holes 8 drilled therethrough at an average space between small and large holes respectively of six inches in order to receive cross tubes 10 which are in turn fastened to the I-beams with fittings 12 as shown in Fig. 1. To these cross members 10 are rigidly but movably connected vertical members 14 by means of fittings 16 and the vertical members 14 may be braced at the top by members 18 connected thereto in a manner similar to the connections 16. The vertical members 14 are rigidly but detachably connected at intervals to a longitudinal member or members 20 through the medium of members 18. This may comprise the preferable form of frame.

At suitable points on the tubular members 10, 14, 18 and 20, universal clamping members or units, generally designated 22, may be slidably connected and arranged for adjustment in any position thereon and these clamping members or units are adapted to secure the various members of a structure to be assembled, such as the members 24, 26, 28, 30 and 32. These clamps 22 comprise a split clamp fitting 34 adapted to be clamped to a tubular member 10 by means of a clamp screw 38, a second split clamp portion 40 adapted to clamp to a member 42 by means of clamp screws 44, 44' and the member 42 which is tubular in form and may have thereon provided any suitable form of clamping means. In the drawing, I have shown one form which this clamp may take and a form of adjustment therefor. The tubular member 42 is slotted at its outer end as is shown at 46 (Fig. 2) and the end thereof cut at a forty-five degree V-shape in order to provide secure clamping surfaces. In one end of the barrel member 42 is threaded an adjustment screw 48 which also is secured by screw threads or other means to the jaw 50 of the clamp and around the stem 52 of the adjusting screw, interiorly of the member 42 and confined between the secured end of the jaw 50 and the opposite or opposing end of the member 42 is a compression spring 54 adapted to resist the closing of the jaw 50 and providing a substantial locking means in any position.

In utilizing this form to assemble airplanes of metal fuselage so that the joints thereof may be welded securely and accurately, the various members of the fuselage are secured in the jaws of the clamps in the positions desired. It is not necessary after once fitting the clamping means 22 to again adjust them until another fuselage is to be assembled therein and after the welding of the other assembling operations have been carried out the clamps may be released and the whole form disassembled permitting removal of the completely assembled structure. The ease and accessibility with which metal structures may be assembled in this form and the permanency of all parts thereof render it exceedingly valuable in the assembly of metallic structures wherein welding or similar operations must necessarily be carried out.

What I claim, and desire to secure by Letters Patent is:

1. In a device of the class described, base members having a plurality of adjustable tubes connected therewith, and structural securing members each including a split clamp fitting for engagement with one of said tubes, a second clamp portion, a tubular member in said second clamp and means slidable in said tubular member for engagement with the elements to be assembled.

2. In a device of the class described, base members, substantially horizontal, longitudinal and vertical members relatively adjustable and with respect to said base members and a plurality of means adjustably secured to said horizontal, longitudinal and vertical members for securing elements to be assembled.

3. In a device of the class described, base members, means comprising horizontal, vertical and longitudinal elements adjustably and removably secured to said base member, said means being relatively adjustable and means adjustably secured to said first mentioned means whereby to relatively position a plurality of elements to be assembled.

4. An assembly apparatus comprising, base members, skeleton supporting members relatively adjustable and adjustable thereon, adapted to support elements of a structure to be assembled thereon and universal securing means whereby to fix said structural elements in position.

5. An assembly apparatus comprising, base members, skeleton frame members adjustable in said base members and skeleton members arranged with said forementioned members to form a rigid but adjustable frame and universal securing means connected with said second and third mentioned members whereby to rigidly secure the component elements of a unit to be assembled.

In testimony whereof I affix my signature.

OHMER E. STUTSMAN.